Figure 1:
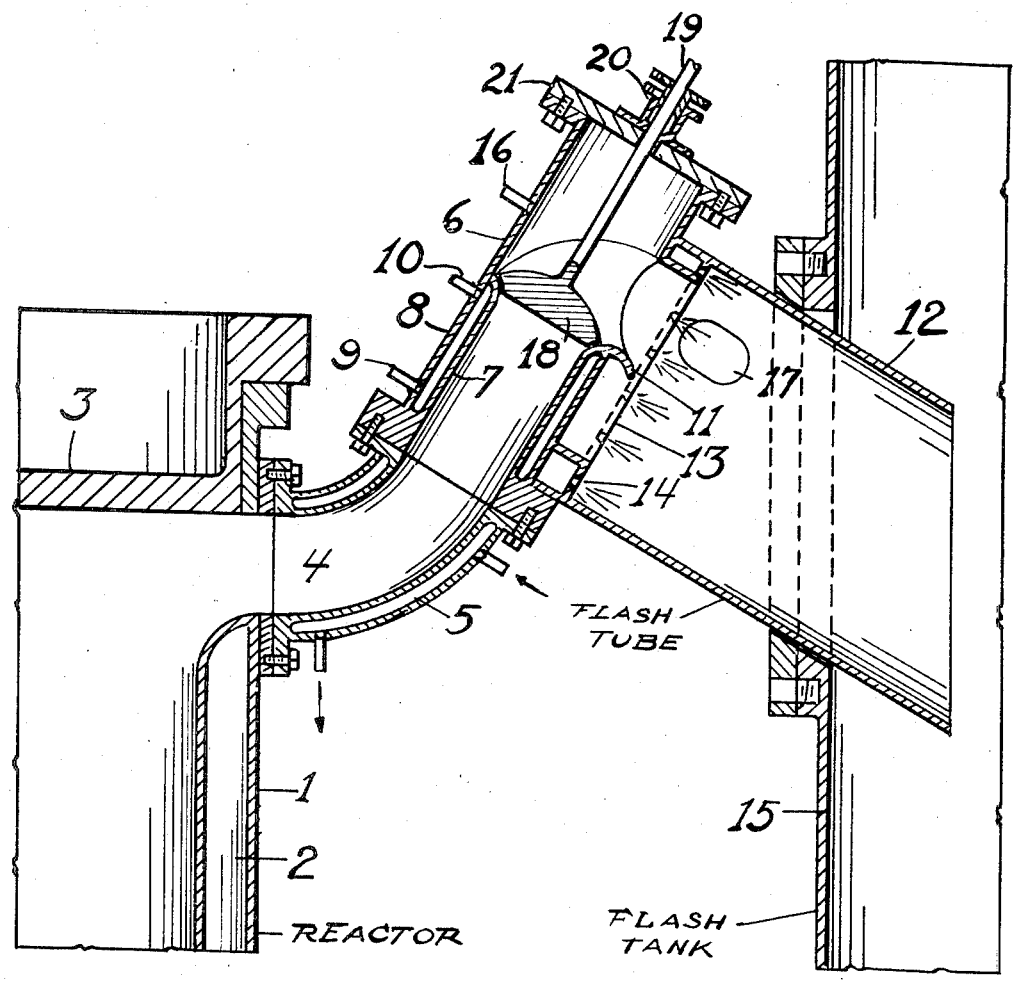

Dec. 20, 1949          J. E. MOISE          2,491,752

APPARATUS AND METHOD FOR POLYMERIZING OLEFINS

Filed Nov. 15, 1945          3 Sheets-Sheet 1

James E. Moise Inventor
By P. L. Young Attorney

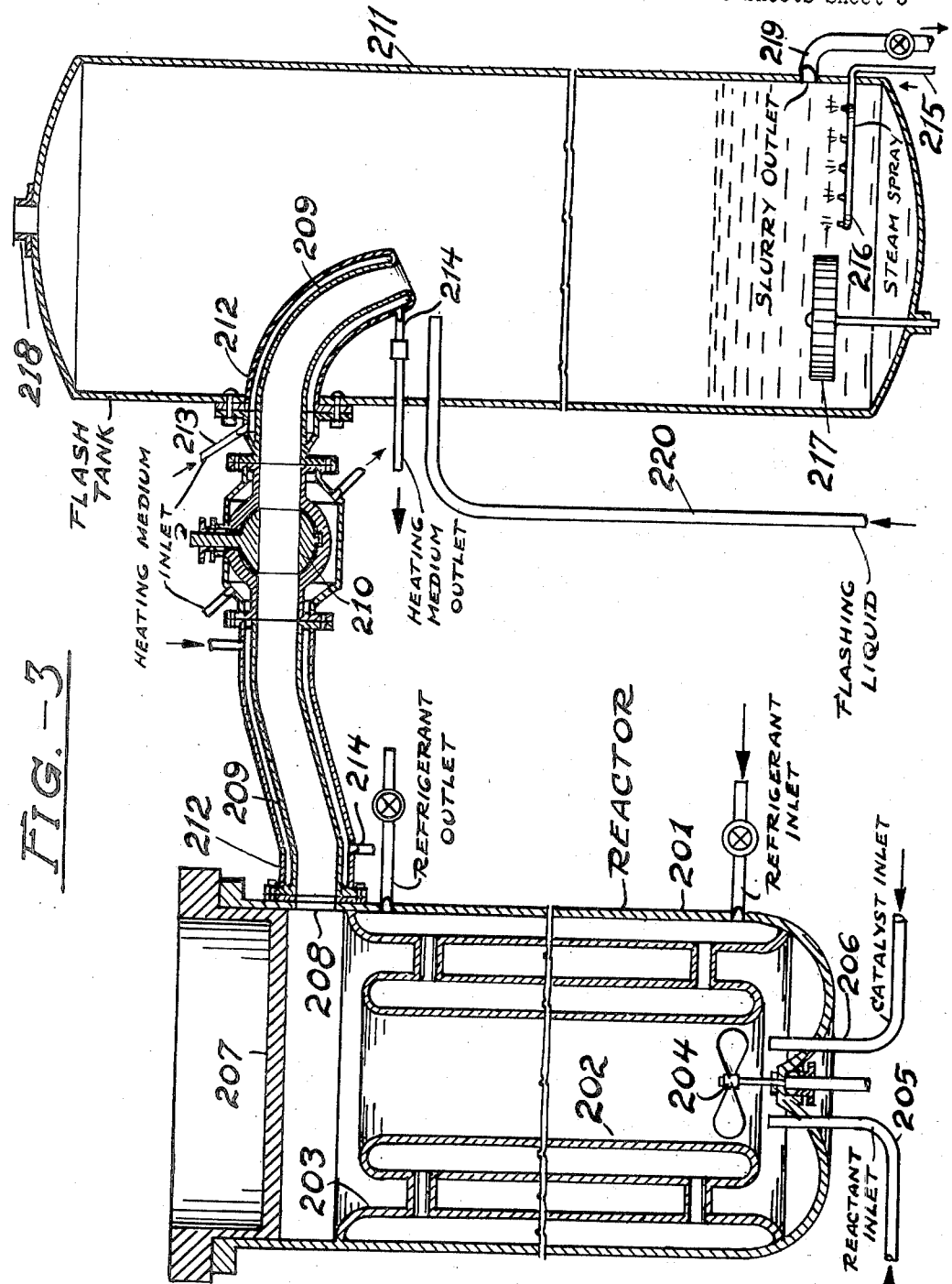

Patented Dec. 20, 1949

2,491,752

UNITED STATES PATENT OFFICE 2,491,752

APPARATUS AND METHOD FOR POLYMERIZING OLEFINS

James E. Moise, Baton Rouge, La., assignor to Standard Oil Development Company, a corporation of Delaware Application November 15, 1945, Serial No. 628,902

7 Claims. (Cl. 260—85.3)

The present invention pertains to the preparation of polymers from isomonoolefins or mixtures of isomonoolefins and diolefins by the treatment thereof with Friedel-Crafts type catalysts at low temperatures, and in particular to a novel reactor which may be utilized for continuous operation of the foregoing reactions.

High molecular weight polymers such as polyisobutylene of 15,000–25,000 up to about 300,000 molecular weight (as determined by the Staudinger method) have been prepared by polymerizing isobutylene in contact with a Friedel-Crafts type catalyst at temperatures below 10° F. and preferably below −40° F. Products which are vulcanizable or curable with sulfur are obtained if a minor proportion of a diolefin is added to a major proportion of an isomonoolefin and the resultant mixture is polymerized at temperatures below −10° F. and preferably at or about −150° F. by the application thereto of a solution of a Friedel-Crafts type catalyst in a solvent which is liquid at reaction temperatures and which does not form a complex with the catalyst, such as a lower alkyl halide, carbon disulfide or the like. These polymerizations have been carried out batchwise and continuously and with liquefied ethylene added to the reaction mixture as a diluent refrigerant or in the presence of substantial amounts of alkyl halides and the like as diluents in apparatus provided with means for absorbing the exothermic heat of reaction. The latter has in general been found to be the preferred method of conducting the polymerization since it not only lends itself well to continuous operation but is capable of better control with the formation of polymers of improved physical characteristics in greater yields. Suitable reactors for carrying out this reaction in this manner essentially comprise a draft tube provided with an agitator arranged centrally of the reactor and a return passageway comprising either a plurality of return tubes affixed between headers arranged around the central draft tube or a continuous annular passageway thereby permitting rapid circulation of the reaction mixture upwardly or downwardly in the central draft tube and through the return tubes or annulus. The draft tube and return passageways are jacketed and a coolant such as liquefied ethylene is circulated in order to remove the heat liberated during the polymerization and maintain the reaction mixture at the low temperatures necessary to form products of the desired properties.

The transfer of the polymer slurry from the reactor at about −150 F. to the atmosphere at ordinary room temperatures of about 70° F. or to the flash tank at about 150° F. has presented very serious and knotty problems. Although the polymer particles are relatively non-tacky and show only a slight tendency to agglomerate when maintained at or near the reaction temperature and when at or above room temperature, they do pass through a very tacky phase as they are brought from reaction temperature to or above room temperature. The polymer has shown a particularly strong tendency to foul the discharge line from the reactor and ultimately to plug said line completely. Since this ordinarily necessitates shutting down the reactor, warming the same up and cleansing it with a suitable solvent or dispersing agent for the polymer, a procedure requiring a number of hours for completion, it is obvious that plugging of the discharge line very materially reduces the service factor of the equipment.

It is the object of this invention to provide the art with a low-temperature polymerization reactor having a novel overflow arrangement which very materially improves the service factor of the reactor.

It is a further object of this invention to provide a low-temperature polymerization reactor having an overflow which permits free discharge of polymer slurry from the reactor.

It is also an object of this invention to provide the art with a method of discharging polymer slurries from reactors at temperatures far below room temperature into a flashing zone at temperatures well above room temperature.

These and other objects will appear more clearly from the detailed description and claims which follow.

It has now been found that the discharge of polymer slurries from continuously operated low-temperature reactors may advantageously be effected through an overflow line which opens upwardly from the top of the reactor and which overflow line is heated throughout a major portion of its length to a temperature of between about 100–125° F. and about 250° F. Heating of a line through which polymer slurries are passed from the reactor into a heated flashing medium capable of dispersing the polymer particles was hardly to be expected to keep that line from clogging in view of the fact that the polymer particles are known to become extremely tacky and show a strong tendency to agglomerate at temperatures between reaction temperature and flashing temperatures. Surprisingly, however, it has been found that heating the overflow line as described above does not result in the clogging of the outlet pipe but on the contrary serves to retard the gradual accummulation of polymer on the outlet pipe. The polymer slurry overflows from the heated outlet pipe directly into the flash tank or into a fast moving stream of flashing liquid which carries the polymer to flashing or degassing and other finishing equipment. The exact mechanism by which the heating of the overflow keeps the same free from polymer deposits is not at all clear. The heating of the overflow line may keep the overflow line free from deposited polymer through the volatilization of part of the reaction mixture thereby forming a gas film adjacent the inner surface of the overflow, which gas film prevents the polymer from contacting and fouling the surface of the overflow, or the heating may exert a solvating action upon the polymer deposited in the overflow until the polymer is soft enough to be scuffed off by the overflow stream.

In the description which follows, reference will be made to the accompanying drawings as showing reactor overflows in accordance with the present invention. In the drawings, Figure 1 represents a vertical cross-section through the heated overflow, Figure 2 represents a vertical cross-section of another form of heated overflow which is provided with a power operated ram for clearing the outlet of lumps of polymer, and Figure 3 is a vertical cross-section through a reactor provided with a heated overflow in accordance with this invention which discharges directly into the flash tank.

In Figure 1, I represents a reactor of the heat exchanger type having an inlet for the supply of reactants, an inlet for the supply of catalyst and agitator means for circulating the contents of the reactor, none of which is shown in order to simplify the drawing. A cooling jacket, part of which is shown at 2 is provided for the circulation of a cooling agent such as liquefied ethylene in indirect heat exchange relation with the contents of the reactor. The reactor is provided with a head or cover 3 which is secured to the reactor by any suitable quick-opening means which will permit the ready removal of the head for inspection and cleaning of the interior of the reactor. An outlet 4 is arranged at the top of the reactor and comprises a pipe 5 extending upwardly and connecting with an overflow section 6. The overflow section comprises a double walled lower section comprising an inner wall 7 and an outer wall 8, connections 9 and 10 being provided for the supply of heating fluid to the space between the walls 7 and 8. The heating fluid may be steam, a hydrocarbon or other fluid capable of being heated to the necessary temperature and circulated through the heating jacket. The heating of the overflow section does not have to be by means of the jacket, as shown, but may take other forms such as tube coiled around the overflow pipe or an annular manifold provided with nozzles impinging streams of heating fluid against the overflow pipe. Instead of heating the overflow by means of a heating fluid, suitable electrical heating means may be built into or incorporated around the overflow in order to heat the inner wall of the overflow to the desired operating temperature. The overflow pipe is heated to temperatures of about 100–250° F.

The overflow pipe extends upwardly from the outlet of the reactor a sufficient distance to form a liquid seal on the reactor. The overflow pipe terminates in a weir 11 which extends into a large diameter flash pipe 12. A manifold 13 is arranged at the inlet end of the flash pipe 12 and is connected with a source of supply of heated flashing liquid, preferably water. The manifold is perforated or slotted as at 14 in such a way as to eject a spray or sheet of flashing liquid over the inner surface of the flash pipe 12 with which the polymer slurry comes into contact. The flash pipe 12 is sloped downwardly towards the flash tank proper 15, the discharge end of the flash pipe extending well into the flash tank. The latter is ordinarily filled about one-sixth to about one-third full with a flashing liquid which is vigorously agitated in order to keep the polymer particles well dispersed while open steam is supplied to the flashing liquid to drive off the volatiles from the reaction slurry. An inlet 16 is provided in the overflow pipe 6 for the supply of a flushing gas in order to sweep the volatilized materials out of the overflow and flashing pipes. A handhole 17 is arranged in the flash pipe 12 in order that the operation of the weir 11 may be readily watched and easily reached in the event that the weir becomes fouled with polymer and cleaning or scraping becomes necessary. A block valve 18 actuated by rod 19 which passes through packing gland 20 in cover 21 is provided for stopping off the overflow whenever desired, as during the starting up procedure.

Figure 2:
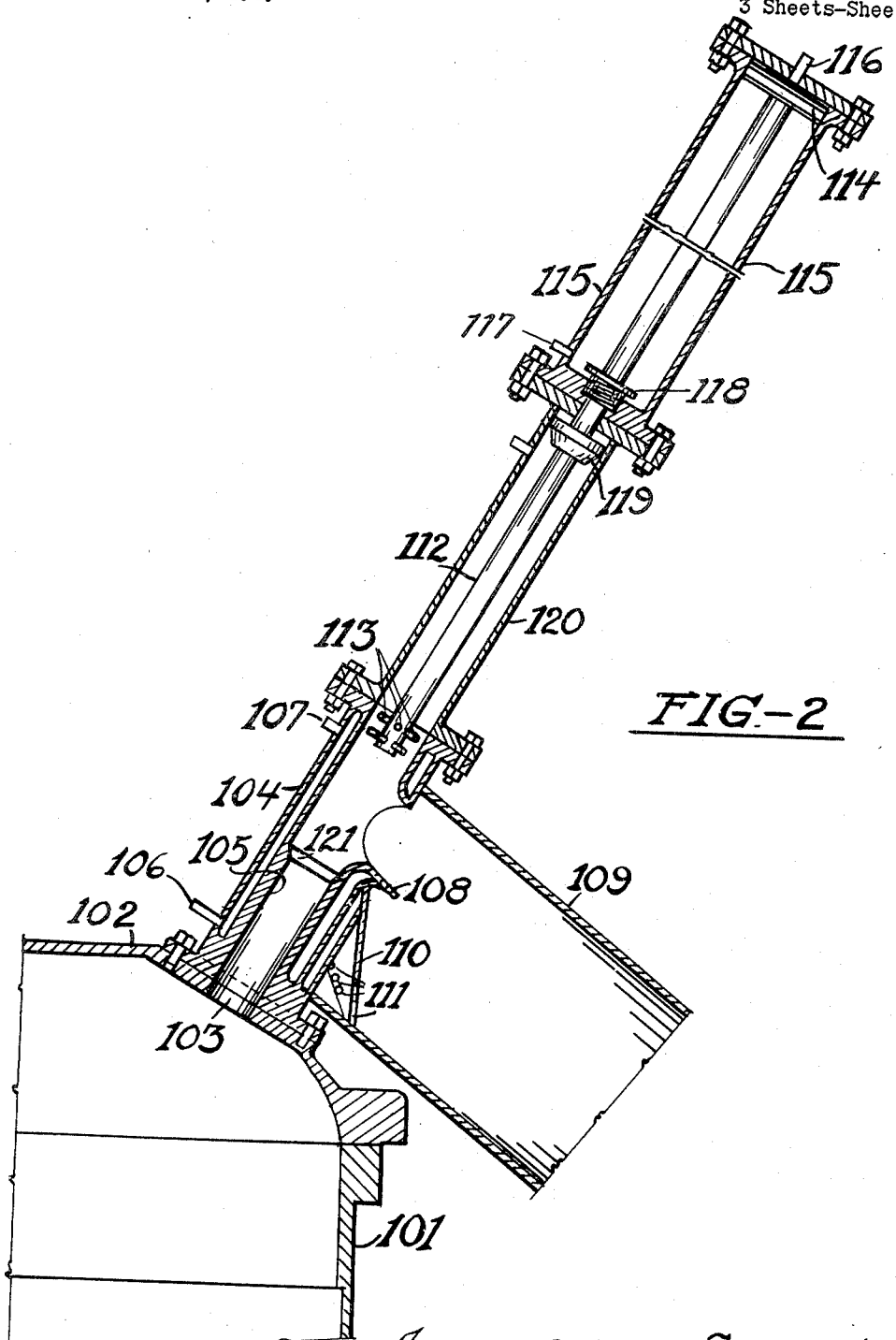

A further embodiment of the present invention is shown in Figure 2 wherein 101 is a reactor having a head 102 provided with an outlet 103 in or near the top thereof. An overflow section comprising an outer wall 104 and an inner wall 105 spaced therefrom is attached to the outlet 103 and extends upwardly a sufficient distance to provide a liquid seal on the reactor. Connections are provided at 106 and 107 for the supply of a heating fluid in order that the inner wall 105 may be brought up to the desired temperature of about 100–250° F. An overflow weir 108 extends into the flashing pipe 109 which has a manifold 110 at its inlet end connected to a supply of heated flashing liquid which is sprayed onto the inner surface of the flash pipe 109 through openings 111 in substantially the same manner as in Figure 1.

In this embodiment, however, I have provided means for forcibly ejecting any lumps of polymer which may tend to clog the outlet or the overflow pipe. The ejector comprises a rod 112 having a plurality of short rods 113 projecting laterally at the end thereof nearest the reactor, the other end of the rod being connected to a piston 114 arranged in cylinder 115. Ports 116 and 117 are provided on the cylinder for the supply of a fluid under suitable pressure to either side of the piston 114 to force the end of the rod 112 into the reactor or to withdraw the same to inactive position. The movement of the rod 112 is guided by the packing gland 118 in the base of the cylinder 115 and by the ring 119 affixed to the rod 112 sliding inside cylinder 120. The ring 119 is provided with a beveled surface as shown and coacts with the shoulder 121 in the overflow pipe 105 to stop the travel of the rod into the reactor and to serve as a valve to block off the overflow.

In Figure 3, 201 is a reactor of the heat exchange type comprising a central draft tube 202 and an annular return passageway 203. A jacket surrounds the central draft tube as well as the return passageway through which a suitable refrigerant such as liquefied ethylene is circulated in order to maintain the contents of the reactor at the desired temperature. A propeller type agitator 204 is arranged at the bottom of the central draft tube 202 for circulating the contents of the reactor. An inlet 205 for the supply of reaction mixture and an inlet 206 for the supply of catalyst solution are arranged in a zone of high turbulence near the agitator 204. The reactor is provided with a cover 207 which is secured to the reactor body by suitable quick-opening means.

An outlet 208 is arranged at the top of the reactor for the discharge of reaction mixture or slurry of polymer particles in cold reaction liquids. Overflow pipe 209 is connected to the outlet 208 of the reactor and is bent upwardly a sufficient distance to form a liquid seal upon the reactor. A stream lined cock 210 provided with a suitable heating jacket is arranged in the overflow line 209 in order to check the flow of reaction mixture from the reactor. The overflow pipe extends into the flash tank 211 and is bent downwardly therein for a sufficient distance to direct the flow of reaction mixture toward the main body of flashing liquid in the flash tank rather than towards the walls of the flash tank. A heating jacket 212 surrounds the valve 210 and the overflow pipe 209 throughout its entire length from the reactor into the flash tank and, as shown is provided with inlets 213 and outlets 214 for the circulation of a suitable heating medium. Instead of a heating jacket as shown, heating of the overflow line 209 could be effected by means of a heating coil wound around the overflow or by electrical heating elements built into or around the overflow pipe and valve.

The flash tank 211 is maintained about one-sixth to one-third full with a suitable flashing liquid, preferably water, which is maintained at the desired temperature level, about 150° F., by the introduction of steam through line 215 and distributor 216. An agitator 217 is arranged in the flash tank to keep the polymer particles well dispersed in the flashing liquid. Volatilized reactants and diluents are withdrawn from the flash tank through outlet 218 and passed to suitable fractionation and recovery equipment. The slurry of polymer particles in flashing liquid is withdrawn from the flash tank through outlet 219 and is passed to dewatering, drying and other finishing and packaging equipment. Make-up flashing liquid to maintain the liquid in the flash tank at the desired level is supplied through line 220 and may be directed into the flash tank in such a manner as to impinge against and break up the stream of reaction mixture between the end of the overflow line 209 and the surface of the liquid in the flash tank.

The operation of the reactor overflow in accordance with the present invention is as follows: Reaction mixture comprising about one part of a 97.5% isobutylene=2.5% isoprene mixture in from about one to five parts of methyl chloride is supplied continuously to the reactor and circulated therein. A suitable refrigerant such as liquefied ethylene is circulated in indirect heat exchange relation to the reactants in order to cool the same to the desired reaction temperature. Catalyst solution comprising about 0.15% of AlCl₃ dissolved in methyl-chloride is introduced continuously into the reactor in a zone of high turbulence near the agitator. A slurry of solid polymer particles in cold reaction mixture is discharged continuously through the outlet at the top of the reactor. As the slurry passes through the overflow pipe, heated, straight-run mineral spirits boiling in the range between 150 and 200° C., steam or other heating agent brings the temperature of the overflow pipe up to about 100 to 250° F. The reaction mixture flows over the weir in the overflow pipe and falls into a rapidly moving stream of heated flashing liquid, preferably water at about 150° F. which is discharged from the manifold onto the inner surface of the flash pipe. The flashing liquid flashes off volatiles contained in the reaction mixture and carries the polymer as a slurry into the flash tank proper wherein further stripping or removal of volatiles is effected. The slurry of polymer in flashing liquid is, if desired, subjected to a vacuum stripping operation, then separated from flashing liquid, washed, dried and subjected to the usual finishing operations.

The process and apparatus in accordance with the present invention are applicable to the preparation of any solid, high molecular weight, low temperature polymerizates from isoolefinic hydrocarbons or from mixtures of isoolefinic hydrocarbons with a diolefinic compound capable of copolymerizing with isoolefinic materials at low temperatures in the presence of Friedel-Crafts type catalysts. The preferred isoolefin is isobutylene but other isoolefins containing up to 8 carbon atoms per molecule may be used. The copolymerizable diolefinic materials include butadiene and substituted butadienes, especially isoprene, piperylene and dimethyl butadiene. Other polyolefinic materials containing up to 12 or 14 carbon atoms per molecule and certain non-conjugated diolefins, such as dimethyl allene and the like are also useful. The olefinic materials are preferably mixed with from an equal to a five-fold quantity of a suitable diluent such as methyl or ethyl chloride cooled to temperatures below about −40° F. and polymerized by the addition of a Friedel-Crafts type catalyst dissolved in a solvent which is liquid at reaction temperature and does not form a complex with the catalyst. Such materials include methyl-, ethyl-, or propyl-, mono-, or polyhalides or carbon disulfide.

The refrigerant which is preferred is liquefied ethylene in view of the fact that it boils at about −155° F. at atmospheric pressure. Other refrigerants such as mixtures of solid carbon dioxide and liquid propane, or liquid ethane, liquid methane, methyl chloride and the like may be used. The reactants, catalysts, solvents and the like which may be used and the general properties of the polymer formed are described in U. S. Patent No. 2,203,873, and Australian Patent No. 112,875 and its counterpart U. S. Patent No. 2,356,128. A polymerization apparatus somewhat similar to the one claimed herein, but not containing the overflow heating means which is characteristic of the present invention, is described in co-pending U. S. patent application Serial No. 622,074, filed on October 12, 1945.

The foregoing description contains a limited number of embodiments of the present invention. It will be understood, however, that such embodiments are only illustrative and that numerous variations are possible without departing from the purview of this invention as defined in the following claims.

What I claim and desire to secure by Letters Patent is:

1. In a process for preparing linear polymers by the polymerization of a major proportion of isobutylene and a minor proportion of a diolefin having 4 to 6 carbon atoms per molecule in an alkyl chloride having less than three carbon atoms per molecule in a reaction zone at a temperature between −40° F. and −155° F. and in the presence of a solution of aluminum chloride in an alkyl halide having up to three carbon atoms per molecule, thereby forming a slurry of polymer in cold reaction liquid, the improvement comprising withdrawing a stream of the resulting slurry of solid polymer particles in cold reaction liquid from said reaction zone through an enclosed withdrawal zone, heating the circumferential portion of the stream to a temperature between 100° and 250° F. as soon as it is withdrawn from said reaction zone and then discharging said stream into a body of hot water contained in an enclosed flashing zone.

2. In a polymerization process which comprises continuously supplying a reaction mixture of an isoolefin having 4 to 8 carbon atoms per molecule and a diluent to a reaction zone, cooling said mixture to a temperature between —40° F. and about —155° F., introducing a Friedel-Crafts catalyst into the cooled mixture to effectuate polymerization, withdrawing a stream of slurry of resulting polymer particles in cold reaction liquid from the reaction zone through an enclosed withdrawal zone, and discharging the stream of polymer slurry into hot water contained in an enclosed flashing zone, the improvement which comprises heating the circumferential portions of the slurry stream throughout a major portion of its length to a temperature between 100 and 200° F. while in the enclosed withdrawal zone.

3. A process according to claim 2 wherein the diluent is an alkyl chloride having less than 3 carbon atoms per molecule.

4. A process according to claim 2 wherein the reaction mixture contains a major proportion of isobutylene, a minor proportion of isoprene and methyl chloride diluent, and wherein the catalyst is a solution of aluminum chloride in methyl chloride.

5. A low temperature polymerization apparatus comprising a jacketed vessel interconnected to a second vessel by a conduit extending between the upper portions of said vessels, said conduit extending upwardly from said first vessel and then downwardly into and through the wall of said second vessel, a valve at the top of the upward reach of said conduit, said upward reach being jacketed to the point of the valve seat, and nozzles arranged to spray the walls of the downwardly extending portion of the conduit.

6. An apparatus according to claim 5 wherein said valve comprises a packing gland at the top of said upward reach, an ejector rod slidably passing through said gland into said upward reach, a shoulder within said upward reach, and a ring affixed to an intermediate portion of said ejector rod and arranged to seal off said upward reach when seated on said shoulder.

7. An apparatus according to claim 5 wherein a portion of the wall of said upward reach extends into the downward portion of said conduit and forms a weir therein.

JAMES E. MOISE.

REFERENCES CITED

The following references are of record in the file of this patent:

UNITED STATES PATENTS

| Number | Name | Date |
|---|---|---|
| 1,990,113 | Burghart | Feb. 5, 1935 |
| 2,273,158 | Thomas et al. | Feb. 17, 1942 |
| 2,324,195 | Carlson et al. | July 13, 1943 |
| 2,360,632 | Mann | Oct. 17, 1944 |
| 2,399,672 | Green et al. | May 7, 1946 |
| 2,408,128 | Squires | Sept. 24, 1946 |